United States Patent
Moles et al.

(10) Patent No.: US 6,775,285 B1
(45) Date of Patent: Aug. 10, 2004

(54) SYSTEM AND METHOD FOR SECURE PROVISIONING OF A MOBILE STATION FROM A PROVISIONING SERVER USING IWF-BASED IP ADDRESS TRANSLATION

(75) Inventors: Bryan J. Moles, Dallas, TX (US); Sudhindra P. Herle, Plano, TX (US)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/501,468

(22) Filed: Feb. 9, 2000

(51) Int. Cl.[7] ................................................. H04J 3/22
(52) U.S. Cl. ..................... 370/392; 370/461; 370/466; 455/410; 455/435.1; 455/445; 455/455; 455/502; 713/201
(58) Field of Search ........................ 370/310.1, 310.2, 370/328, 331, 338, 352, 389, 392, 461, 466; 455/422.1, 426, 435.1, 445, 455, 502, 554, 555, 490; 713/201

(56) References Cited

U.S. PATENT DOCUMENTS

| | | | |
|---|---|---|---|
| 6,389,276 B1 * | 5/2002 | Brilla et al. | 455/413 |
| 6,397,259 B1 * | 5/2002 | Lincke et al. | 709/236 |
| 6,470,179 B1 * | 10/2002 | Chow et al. | 455/406 |
| 6,493,551 B1 * | 12/2002 | Wang et al. | 455/432 |
| 6,539,237 B1 * | 3/2003 | Sayers et al. | 455/555 |
| 6,542,754 B1 * | 4/2003 | Sayers et al. | 455/502 |
| 6,542,992 B1 * | 4/2003 | Peirce, Jr. et al. | 713/153 |
| 6,608,832 B2 * | 8/2003 | Forslow | 370/353 |

* cited by examiner

*Primary Examiner*—Steven Nguyen
*Assistant Examiner*—Roberta Stevens (57) ABSTRACT

There is disclosed an interworking function unit for transferring data between a wireless network and an Internet protocol (IP) data network coupled to the wireless network. The interworking function unit comprises a protocol conversion controller that receives incoming data packets from the wireless network, wherein the incoming data packets are generated by a first mobile station and are formatted according to a protocol associated with the wireless network. The interworking function unit converts the incoming data packets to IP data packets formatted according to an Internet protocol of the IP data network. The interworking function unit also comprises a first security controller for preventing unprovisioned mobile stations from accessing the IP data network through the wireless network. The first security controller receives the IP data packets and replaces each original IP packet header with a replacement IP packet header containing the IP address of a provisioning server.

20 Claims, 5 Drawing Sheets

SYSTEM AND METHOD FOR SECURE PROVISIONING OF A MOBILE STATION FROM A PROVISIONING SERVER USING IWF-BASED IP ADDRESS TRANSLATION

CROSS-REFERENCE TO RELATED APPLICATIONS

The present invention is related to those disclosed in the following United States Patent Applications:

1. Ser. No. 09/500,499, filed concurrently herewith, entitled "SYSTEM AND METHOD FOR SECURE OVER-THE-AIR PROVISIONING OF A MOBILE STATION FROM A PROVISIONING SERVER VIA A TRAFFIC CHANNEL;"

2. Ser. No. 09/475,602, filed on Dec. 30, 1999, entitled "SYSTEM AND METHOD FOR SECURE PROVISIONING OF A MOBILE STATION FROM A PROVISIONING SERVER USING IP ADDRESS TRANSLATION AT THE BTS/BSC;" and 3. Ser. No. 09/475,766, filed on Dec. 30, 1999, entitled "SYSTEM AND METHOD FOR SECURE PROVISIONING OF A MOBILE STATION FROM A PROVISIONING SERVER USING ENCRYPTION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to wireless networks and, more specifically, to a system for performing secure over-the-air (OTA) provisioning of cellular phone handsets and other mobile devices.

BACKGROUND OF THE INVENTION

Reliable predictions indicate that there will be over 300 million cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a subscriber handset (or mobile station) and another party through the wireless network. A smaller number of mobile stations are data devices, such as personal computers (PCs) equipped with cellular/wireless modems. Because the bandwidth for a current generation mobile station is typically limited to a few tens of kilobits per second (Kbps), the applications for the current generation of mobile stations are relatively limited. However, this is expected to change in the next (or third) generation of cellular/wireless technology, sometimes referred to as "3G" wireless/cellular, where a much greater bandwidth will be available to each mobile station (i.e., 125 Kbps or greater). The higher data rates will make Internet applications for mobile stations much more common. For instance, a 3G cell phone (or a PC with a 3G cellular modem) may be used to browse web sites on the Internet, to transmit and receive graphics, to execute streaming audio and/or video applications, and the like. In sum, a much higher percentage of the wireless traffic handled by 3G cellular systems will be Internet protocol (IP) traffic and a lesser percentage will be traditional voice traffic.

In order to make wireless services as convenient and as affordable as possible, wireless service providers frequently sell cellular handsets (or other types of mobile stations) directly to potential subscribers from display booths in supermarkets and department stores. Simple instructions are provided to guide the buyer through the process of activating the cellular handset and signing up for wireless services to become a subscriber. In conventional cellular systems, the handset buyer activates the new handset and begins the provisioning process by dialing "*228xx" on the handset keypad in accordance with the handset instructions. The value of "xx" varies according to the identity of the wireless service provider that sells the handset.

Although initially unprovisioned, the new handset must, of necessity, have certain minimum radio frequency (RF) communication capabilities that enable the handset to become provisioned. Dialing "*228xx" on the handset keypad automatically initiates a special purpose call that connects the handset buyer to an operator. The operator requests certain account information from the buyer, such as personal information, a credit card number, home billing address, and the like. When the account information is collected and the account is set up, the operator instructs the handset buyer to enter several sequences of passwords, code numbers, menu-selected commands, and the like, that enable certain functions in the handset.

This process is frequently referred to as "service provisioning." Service provisioning may activate in the cellular handset a Number Assignment Module (NAM), which gives the handset a unique phone number for incoming calls and provides a roaming capability by identifying approved wireless carriers. Service provisioning may also activate in the handset a Preferred Roaming List (PRL), which is a list of frequencies/bands owned by each carrier in each geographical region and which may identify preferred and/or prohibited frequencies in each region as well. Service provisioning also activates an authentication code, sometimes referred to as an "A-key," in the cellular handset. The handset uses the A-key to authenticate the handset when the subscriber attempts to access the wireless network.

The wireless network uses a home location register (HLR) to store the A-key, the phone number, the roaming capability information, and other data related to each handset that has been or is being authenticated and provisioned by the wireless network. The HLR is a permanent database used by the wireless service provider to identify/verify a subscriber and store individual subscriber data related to features and services. The subscriber's wireless service provider uses the HLR data when the subscriber is accessing the wireless network in the subscriber's home coverage area. Other wireless service providers also use the HLR data (typically accessed via wireline telephone networks) when the subscriber roams outside the subscriber's home coverage area.

The conventional provisioning process described above has numerous drawbacks. A human operator must talk the user through the process of pressing keys and verifying screen results. This is time consuming and frequently results in errors, particularly with unsophisticated subscribers. Mistakes may go unnoticed initially and the subscriber may become frustrated that the cellular service does not operate as advertised. When the mistake is finally diagnosed, the provisioning process may need to be at least partially re-performed. The human operator also adds labor costs to the provisioning process.

It would be preferable to automate cellular service provisioning to the greatest extent possible in order to reduce labor costs, eliminate errors, and make the process more user-friendly by minimizing or eliminating subscriber interaction. In particular, it would be far more convenient to perform over-the-air (OTA) cellular service provisioning by accessing a provisioning server from an unprovisioned handset via an Internet connection. In such a scenario, the handset does not place a voice call to an operator, but rather places a "data call" that transmits Internet protocol (IP) packets to, and receives IP packets from, a base station of the wireless network. The 3G systems will make OTA service provisioning of handsets easier and more common.

However, OTA service provisioning of a handset presents serious security problems for the wireless service provider, particularly with respect to fraud. The base station that handles the initial set-up data call from an unprovisioned handset may not store the required provisioning data. Instead, base stations typically access provisioning data from one or more provisioning servers within the wireless service provider's network and which may or may not be accessible by an intranet or by the Internet. Many wireless service providers operate clusters of base stations that are not directly connected to each other, but rather are connected to the local Bell telephone companies and/or to the major long-distance carriers. Without an Internet or intranet connection, each cluster of base stations would require its own provisioning server. Alternatively, a wireless carrier would have to pay the local Bell companies and/or a long distance company additional line fees to connect the base stations to the provisioning server.

Using an Internet connection allows a wireless service provider to consolidate all service provisioning applications and data in a central repository, rather than maintaining at great expense redundant copies of such information among a large number of provisioning servers. However, it is foreseeable that a sophisticated user could use an unprovisioned handset (possibly with some minor modifications) to access a wireless network under the guise of service provisioning and then use the wireless network to access any IP address on the Internet, not just the IP address of the provisioning server. In effect, the user could defraud the wireless service provider by using the unprovisioned handset to surf the Internet for free. The user may also use the same IP connection to commit other kinds of fraud or illegal activities.

This problem exists for several reasons. First, IP addresses of other services are freely known to the public. Second, conventional wireless networks do not provide a method or an apparatus capable of blocking access to unauthorized IP addresses that is triggered by the network's knowledge that the mobile is unprovisioned. Third, even if the network provides the mobile with an IP address to be used for provisioning, the mobile must be trusted to use that IP address only.

Therefore, there is a need in the art for improved systems and methods for performing automatic service provisioning of wireless handsets (and other types of mobile stations). In particular, there is a need in the art for systems and methods for performing secure over-the-air provisioning of wireless devices. More particularly, there is a need for systems and methods that are capable of preventing unauthorized persons from using an unprovisioned handset or other type of mobile station to access any IP service other than the provisioning server.

SUMMARY OF THE INVENTION

To address the above-discussed deficiencies of the prior art, it is a primary object of the present invention to provide, for use in association with a wireless network comprising a plurality of base stations capable of communicating with a plurality of mobile stations, an interworking function unit capable of transferring data between the wireless network and an Internet protocol (IP) data network coupled to the wireless network. According to an advantageous embodiment of the present invention, the interworking function unit comprises a protocol conversion controller capable of receiving from the wireless network a first plurality of data packets, wherein the first plurality of data packets are generated by a first one of the plurality of mobile stations and are formatted according to a first protocol associated with the wireless network, and converting the first plurality of data packets to a plurality of IP data packets formatted according to an Internet protocol associated with the IP data network. The interworking function unit further comprises a first security controller for preventing unprovisioned mobile stations from accessing the IP data network through the wireless network, wherein the first security controller is capable of receiving at least one of the plurality of IP data packets and replacing an original IP packet header of the at least one IP data packet with a replacement IP packet header comprising an IP address of a selected one of at least one provisioning server coupled to the IP data network and controlled by an operator of the wireless network.

According to one embodiment of the present invention, the interworking function unit further comprises a second security controller capable of determining that the first mobile station is unprovisioned.

According to another embodiment of the present invention, the second security controller is disposed in the protocol conversion controller.

According to still another embodiment of the present invention, the second security controller is disposed in the first security controller.

According to yet another embodiment of the present invention, the second security controller determines that the first mobile station is unprovisioned according to a value of a provisioned bit associated with at least one of the first plurality of data packets.

According to a further embodiment of the present invention, the first security controller selects the at least one provisioning server by selecting the IP address in the replacement IP packet header according to a load spreading algorithm.

According to a still further embodiment of the present invention, the interworking function unit further comprises a memory associated with the first security controller capable of storing load statistics associated with the at least one provisioning server.

According to a yet further embodiment of the present invention, the first security controller selects a least busy one of the at least one provisioning server according to the load statistics.

One job of the IWF (normally) is to assign an IP address to a handset when the handset places a data call. In accordance with the principles of the present invention, after the second security controller determines that the handset is unprovisioned the IP addresses can be assigned from a special pool of addresses allocated only to unprovisioned handsets. Then, in future routing operations, the IWF may rout IP packets with the special IP addresses only to controlled destinations. In other words, packets generated by provisioned handsets may be distinguished from packets generated by unprovisioned handsets simply by looking at the previously assigned IP address.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
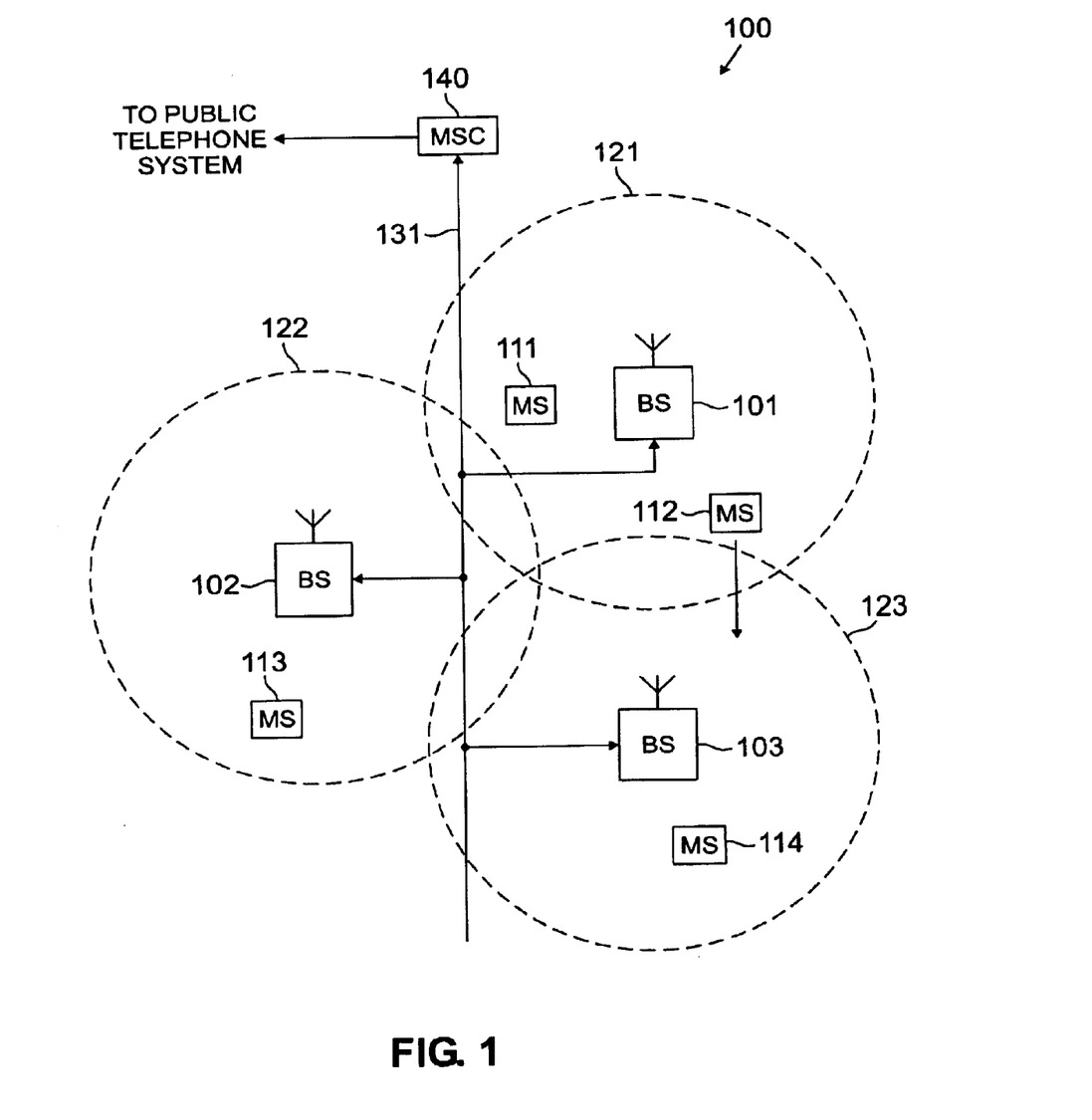
FIG. 1 illustrates a general overview of an exemplary wireless network according to one embodiment of the present invention.

FIG. 1 illustrates a general overview of an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

One or more of mobile stations 111–114 may initially be unprovisioned devices. That is, necessary configuration data, such as Number Assignment Module (NAM) data, Preferred Roaming List (PRL) data, or authentication code (or "A-key") data may not be present in, for example, MS 112 or, if present, may not be properly configured or enabled, so that MS 112 is unable to communicate with BS 101. To enable such unprovisioned devices to operate in wireless network 100, an over-the-air (OTA) service provisioning capability is provided in wireless network 100.

Figure 2:
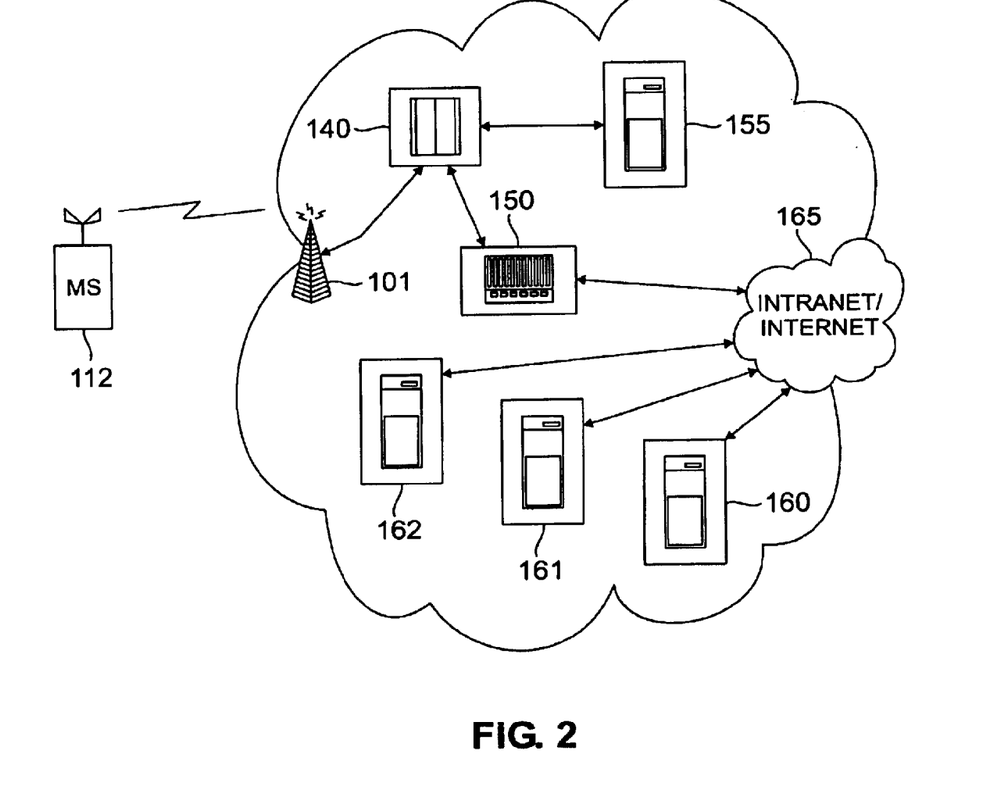
FIG. 2 illustrates an alternate view of selected portions of the exemplary wireless network in FIG. 1 that perform over-the-air (OTA) service provisioning according to one embodiment of the present invention.

FIG. 2 illustrates an alternate view of selected portions of exemplary wireless network 100 that perform over-the-air (OTA) service provisioning according to one embodiment of the present invention. MS 112, BS 101, and MSC 140 are still present, as in FIG. 1. In FIG. 2, wireless network 100 further comprises interworking function (IWF) unit 150, home location register (HLR) 155, and provisioning servers 160–162. Provisioning servers 160–162 are system-wide central servers that are located remote from the other components of wireless network 100, namely, BS 101, MSC 140, IWF unit 150, and HLR 155. In order to access data in provisioning servers 160–162, MSC 140 communicates with one of provisioning servers 160–162 via intranet/Internet 165 (hereafter "Internet 165"). Since data within wireless network 100 may be communicated in one or more of a wide variety of communication protocols, according to the choices made by the wireless service provider, IWF unit 150 is needed to translate the "native" communication transport protocol that carries application data in wireless network 100 into Internet protocol (IP) based data packets suitable for transmission in Internet 165.

As will be explained below in greater detail, if an unprovisioned mobile station, such as MS 112, accesses wireless network 100 (via BS 101), then BS 101 and/or MSC 140, using the handset data in HLR 155, identifies MS 112 as an unprovisioned handset and establishes a session with one of provisioning servers 160–162 via Internet 165 in order to perform service provisioning of MS 112. However, because Internet 165 is a network not owned or controlled by the wireless service provider that operates wireless network 100, the present invention provides security protection that prevents an unauthorized person from using MS 112 to access other servers/web sites in Internet 165. This security is provided by adapting IWF unit 150 to forcibly direct all calls received from unprovisioned mobile stations to a selected one of provisioning servers 160–162. Furthermore, in order to balance the load among provisioning servers 160–162, the present invention selects one of provisioning servers 160–162 to perform the service provisioning according to a system-defined "load spreading" algorithm. The present invention can direct the data call from MS 112 to, for example, the least busy one of provisioning servers 160–162 in order to prevent bottlenecks at any of provisioning servers 160–162.

It should be noted that the scope of the present invention is not limited to wireless networks that use the Internet to link base stations and provisioning servers. In alternate embodiments of the present invention, Internet 165 may actually be a large intranet having a relatively minimal amount of security that links a group of base stations to one or more provisioning servers.

Figure 3:
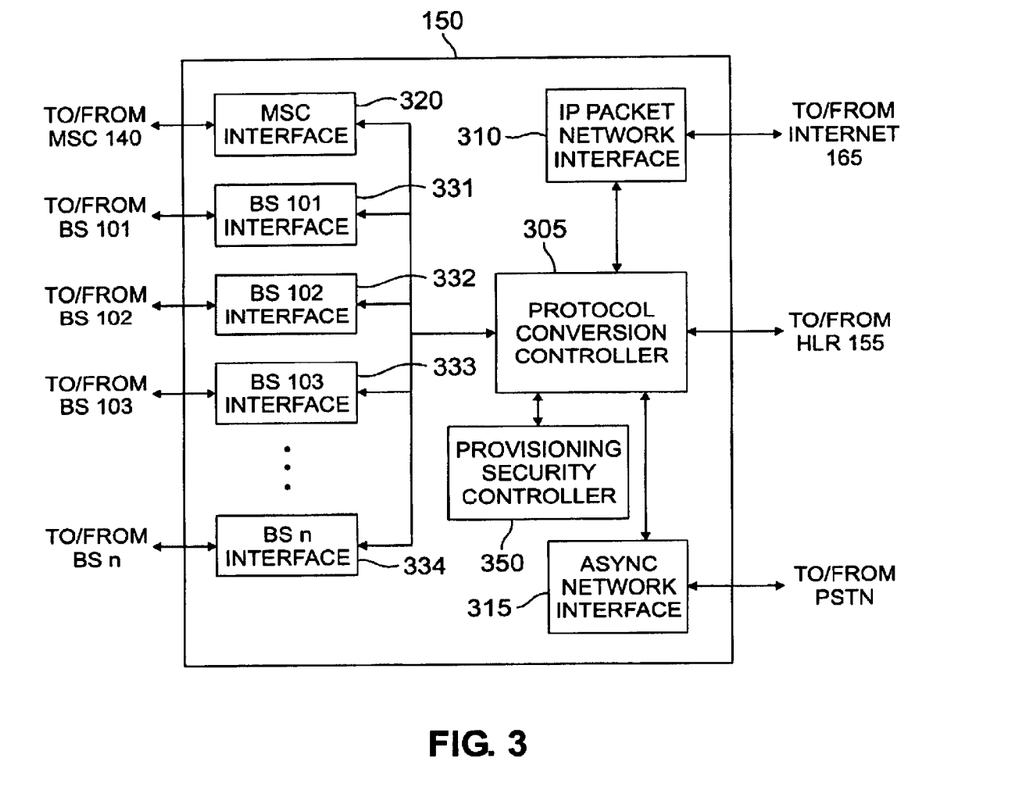
FIG. 3 illustrates in greater detail an interworking function unit according to one embodiment of the present invention.

FIG. 3 illustrates in greater detail interworking function (IWF) unit 150 according to one embodiment of the present invention. IWF unit 150 comprises protocol conversion controller 305, IP packet network interface 310, asynchronous (async) network interface 315, MSC interface 320, and provisioning security controller 350. IWF unit 150 also includes up to "N" optional base station interfaces 331–334 for transferring data traffic between protocol conversion controller 305 and one or more of BS 101, BS 102, BS 103 and other base stations in wireless network 100.

Base station interfaces 331–334, labeled BS 101 Interface, BS 102 Interface, BS 103 Interface, and BS N Interface, respectively, are optional since protocol conversion controller 305 in IWF unit 150 is capable of communicating with BS 101–BS 103 indirectly through MSC 140. However, in some embodiments of the present invention, IWF unit 150 may communicate directly with one or more of BS 101–BS 103 or other base stations in wireless network 100. In such embodiments, base station interfaces 331–334 provide direct communication links to the base stations.

The functions of IWF unit 150 are generally well known. The data traffic transmitted between IWF unit 150 and each of BS 101–BS 103 or MSC 140 may include fax data, circuit data and Internet protocol (IP) data. IWF unit 150 may send this data traffic to, and receive this data traffic from, the public switched telephone network (PSTN) or Internet 165, according to data type. Fax data and circuit data are sent to and received from the public switched telephone network through asynchronous network interface 315. Packet data are sent to and received from Internet 165 through IP packet network interface 310.

Protocol conversion controller 305 converts incoming and outgoing data to and from the native formats of IP packet network interface 310, asynchronous network interface 315, MSC interface 320, and base station interfaces 331–334. For example, protocol conversion controller 305 may contain, among other things, transcoding circuitry that receives data from base station interfaces 331–334, or from MSC 140 through MSC interface 320, at, for example, an 8 Kbps rate. Protocol conversion controller 305 then reformats the 8 Kbps data to a 64 Kbps rate before sending it to public switched telephone network 100 through asynchronous network interface 315. In the reverse direction, protocol conversion controller 305 converts circuit data, fax data, and packet data back to 8 Kbps format and sends it to BS 101–BS 103 or MSC 140 via base station interfaces 331–334, or MSC interface 320, respectively. Interworking function units similar to IWF unit 150 described above are available from a number of different vendors, including the CDMA IWF platform with IWF QuickNet Connect™ provided by 3COM Corporation.

Protocol conversion controller 305 and provisioning security controller 350 provide secure service provisioning for mobile stations and prevent unauthorized persons from using an unprovisioned mobile station, such as MS 112, to access servers or web sites in Internet 165 other than one of provisioning servers 160–162. In one embodiment, protocol conversion controller 305 may determine whether or not MS 112 has been provisioned by examining the status of a provisioned bit in data packets from MS 112. The provisioned bit is set by MSC 140 if MSC 140 determines from the information stored in HLR 155 that MS 112 is provisioned. If the provisioned bit for MS 112 is enabled (set), protocol conversion controller 305 determines that MS 112 is properly provisioned and transfers the voice/data call through asynchronous network interface 315 to PSTN 100 for normal call processing. If the provisioned bit for MS 112 is not set, protocol conversion controller 305 determines that MS 112 is not provisioned. In response to a determination that MS 112 is not provisioned, protocol conversion controller 305 transfers all incoming IP packets to provisioning security controller 350 for modification of the IP header information in each incoming IP packet and for subsequent transfer to a selected one of provisioning servers 160–162, as described below in greater detail.

In an alternate embodiment of the present invention, protocol conversion controller 305 may determine that a mobile station accessing MSC 140 is unprovisioned by other methods. For example, protocol conversion controller 305 may compare data packets from MS 112 with corresponding data obtained from HLR 155. In this embodiment, protocol conversion controller 305 first verifies (i.e., authenticates) that MS 112 has been service provisioned using conventional techniques, such as by determining whether or not MS 112 has, for example, a proper shared secret data (SSD) code. Following authentication, protocol conversion controller 305 may then verify whether MS 112 is properly provisioned by comparing data received from MS 112, such as NAM and PRL, with data stored in HLR 155 that is associated with MS 112. If protocol conversion controller 305 determines that MS 112 is properly provisioned, then protocol conversion controller 305 transfers the voice call or data call through asynchronous network interface 315 to PSTN 100 for normal call processing. If protocol conversion controller 305 determines that MS 112 is not properly provisioned, then protocol conversion controller 305 transfers all incoming IP packets to provisioning security controller 350 for modification and for transfer to a selected one of provisioning servers 160–162, as described below in greater detail.

In another alternate embodiment, if MS 112 cannot even authenticate (verify) itself properly using conventional techniques, protocol conversion controller 305 may simply reject the call or may automatically transfer all incoming IP packets from MS 112 to provisioning security controller 350 for modification and for transfer to one of provisioning servers 160–162 through IP packet network interface 310 and Internet 165. Alternatively, if MS 112 has dialed a special telephone number (such as "*228xx") or is attempting to access a special web site (in the case of a data call) reserved for service provisioning, protocol conversion controller 305 may automatically transfer all incoming IP packets from MS 112 to provisioning security controller 350 for modification and transfer to one or more of provisioning servers 160–162.

In other alternate embodiments of the present invention, provisioning security controller 350 may determine whether or not MS 112 is provisioned instead of protocol conversion controller 305. Thus, protocol conversion controller 305 may send all incoming IP packets to provisioning security controller 350, which then determines whether or not MS 112 has been provisioned by, for example, examining the status of a provisioned bit in all data packets from MS 112.

In some embodiments of the present invention, IWF unit 150 may determine the provisioned status of IP packets based on the IP address of IP packets received from base stations. One job of IWF unit 150 is to assign an IP address to a handset when the handset places a data call. After IWF unit 150 determines that the handset is unprovisioned, the IP addresses can be assigned from a special pool of addresses allocated only to unprovisioned handsets. In subsequent routing operations, IWF unit 150 may rout IP packets with special IP addresses only to controlled destinations. Thus, IP packets generated by provisioned handsets may be distinguished from packets generated by unprovisioned handsets simply by looking at the previously-assigned IP address.

Figure 4:
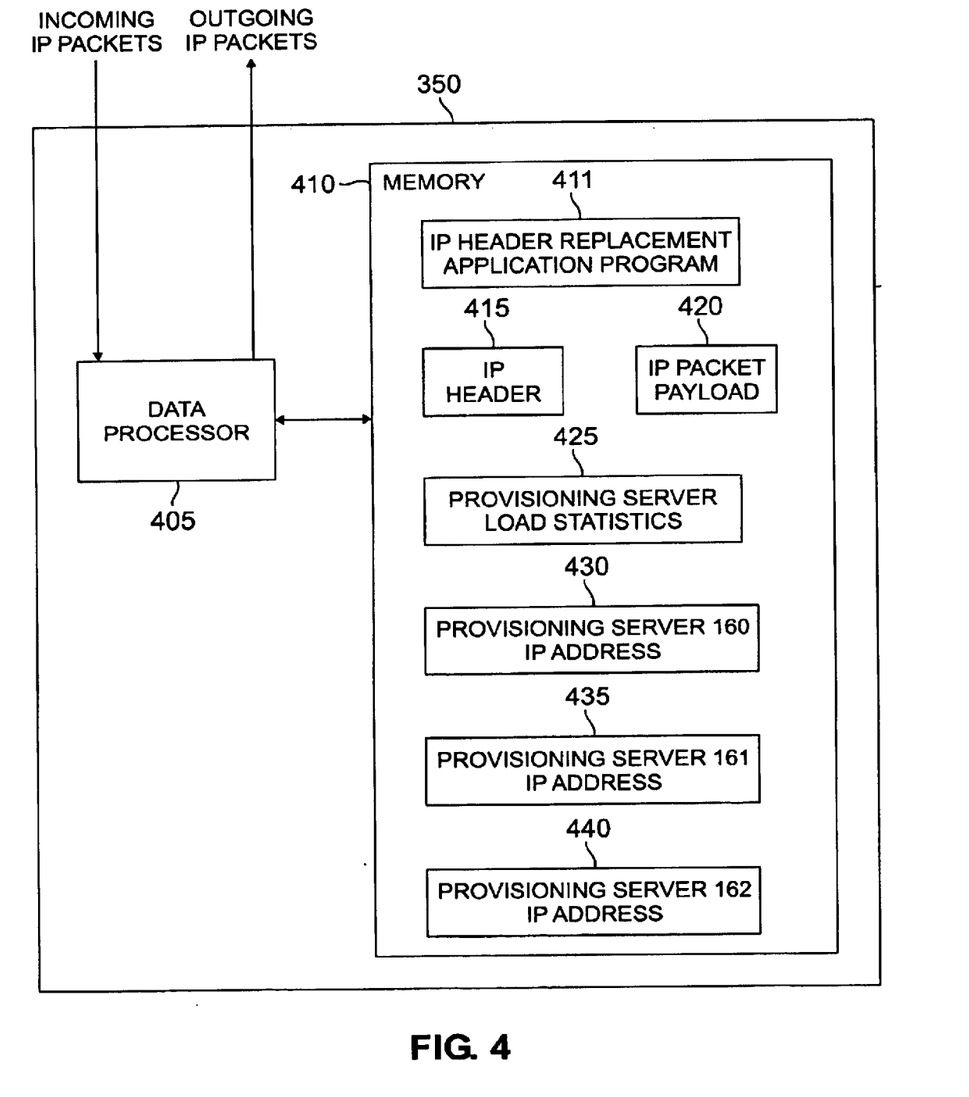
FIG. 4 illustrates in greater detail a provisioning security controller according to one embodiment of the present invention.

FIG. 4 illustrates in greater detail exemplary provisioning security controller 350 according to one embodiment of the present invention. Exemplary provisioning security controller 350 comprises data processor 405 and memory 410, which contains storage space for IP header replacement application program 411, IP header field 415, IP packet payload field 420, provisioning server load statistics field 425, and IP address fields 430, 435, and 440. IP address field 430 stores the IP address for provisioning server 160, IP address field 435 stores the IP address for provisioning server 161, and IP address field 440 stores the IP address for provisioning server 162.

When an unprovisioned mobile station is detected, data processor 405 receives incoming IP data packets from protocol conversion controller 305 and, under control of IP header replacement application program 411, replaces the original IP header of each of the incoming IP data packets with a selected IP header from one of IP address fields 430, 435, and 440. The header-modified IP data packets are then returned to protocol conversion controller 305 as a stream of outgoing IP data packets.

Memory 410 provides storage for data and programs associated with provisioning security controller 350 and IP header replacement application program 411. Incoming IP data packets consist of an IP header, which contains the destination address of the target device to which the IP data packet is being sent, and an IP payload, which contains the user data and/or commands that are being sent to the target device. As incoming IP data packets are received from protocol conversion controller 305, data processor 405, under control of IP header replacement application program 411, stores the IP header information in IP header field 415 and stores the payloads of the IP data packets in IP packet payload field 420.

Next, data processor 405 replaces the original IP header data stored in IP header field 415 with a selected one of the IP addresses stored in IP address fields 430, 435, and 440. Data processor 405 then reassembles each IP data packet by reattaching the modified (i.e., replaced) IP header information to the original IP packet payload retrieved from IP packet payload field 420. The reassembled IP data packets are then transferred to protocol conversion controller 305.

Since the IP header was replaced with a predetermined IP address of one of provisioning servers 160–162, Internet 165 sends the IP packet payloads only to one of provisioning servers 160–162. This feature prevents an unauthorized person or device from using an unprovisioned mobile station to access different web sites in Internet 165 through wireless network 100. The unauthorized person or device cannot access any web site or server other than one of provisioning servers 160–162. Provisioning servers 160–162 process legitimate service provisioning requests from unprovisioned MS 112 and ignore any data and/or commands not related to a service provisioning request that is transmitted by an unauthorized person or device using unprovisioned MS 112.

In one embodiment of the present invention, the method of selecting one of provisioning servers 160–162 may be determined by the data stored in provisioning server load statistics field 425. Provisioning server load statistics field 425 stores traffic load statistics associated with each of provisioning servers 160–162. In some embodiments of the present invention, provisioning server load statistics are provided by each provisioning server associated with wireless network 100. In alternate embodiments, the load statistics information may be provided by other sources.

Under control of IP header replacement application program 411, data processor 405 spreads the service provisioning load among provisioning servers 160–162 by assigning provisioning requests to a selected one of the Internet addresses stored in IP address fields 430, 435, and 440. Data processor 405 accesses provisioning server load statistics 425 and applies a load spreading algorithm to determine which one of provisioning servers 160–162 is best able to perform service provisioning to unprovisioned MS 112.

Various load spreading algorithms are possible for selecting a provisioning server to provision a particular mobile station. In one embodiment, data processor 405 may select the least-busy provisioning server to perform service provisioning to MS 112. In another embodiment, data processor 405 may assign each provisioning server to service a predetermined group of cell sites, without regard to traffic load. In still another embodiment, data processor 405 may assign provisioning servers on a rotating basis, without regard to the traffic load of any of provisioning server 160–162, as long as the next server in sequence has not exceeded a maximum data traffic threshold. Once one of provisioning servers 160–162 has been selected, data processor 405 retrieves the IP address of the selected provisioning server from a corresponding one of IP address fields 430, 435, and 440. The retrieved IP address is used to replace the original IP header information, as described previously.

Figure 5:
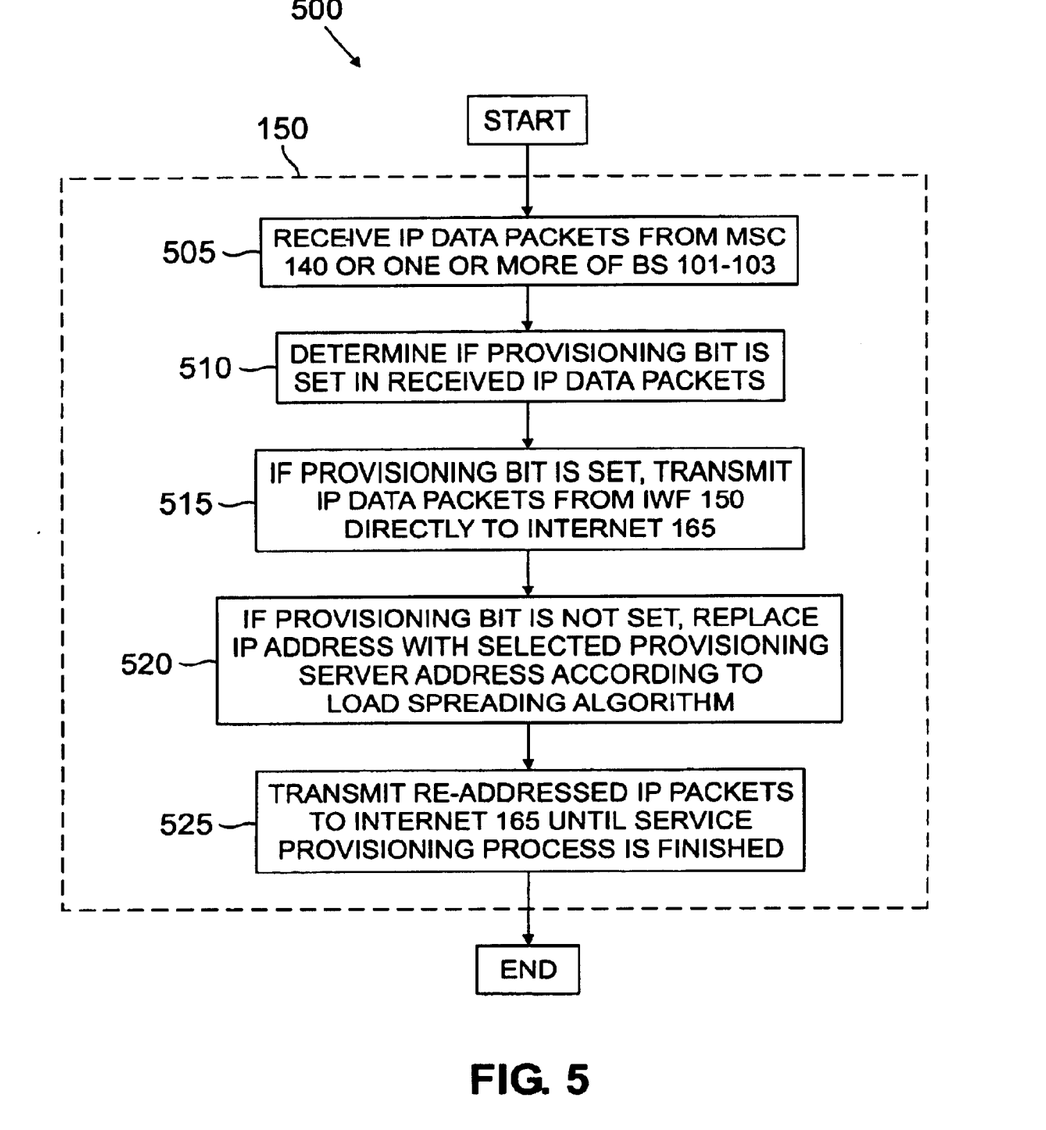
FIG. 5 is a flow chart illustrating an exemplary secure service provisioning operation in the exemplary wireless network according to one embodiment of the present invention.

FIG. 5 depicts flow chart 500, which illustrates an exemplary secure service provisioning operation in IWF unit 150 in wireless network 100 according to one embodiment of the present invention. First, IWF unit 150 receives IP data packets from MSC 140 or one or more of BS 101–BS 103 and transfers the IP data packets to protocol conversion controller 305 (process step 505). Next, protocol conversion controller 305 determines if the provisioned bit in the received IP packets is set or not (process step 510).

If the provisioned bit is enabled (set), protocol conversion controller 305 transfers the received voice and/or data packets to Internet 165 through IP packet network interface 310 (process step 515). If the provisioned bit is not set, provisioning security controller 350 replaces the received IP address with the IP address of a selected provisioning server according to a load spreading algorithm (process step 520).

Thereafter, IWF unit 150 continues to replace (i.e., readdress) the IP headers of all data packets received from MS 112 and transfers the readdressed IP data packets to Internet 165 until the current voice call or data call is terminated by the user. If the user is a legitimate subscriber attempting to provision a mobile station for the first time, this means that IWF unit 150 continues to replace IP data packet headers until the service provisioning process is completed and the subscriber ends the call (process step 525). Once provisioned, the mobile station is ready for normal use.

Although the present invention has been described in detail, those skilled in the art should understand that they can make various changes, substitutions and alterations herein without departing from the spirit and scope of the invention in its broadest form.

What is claimed is:

1. For use in association with a wireless network comprising a plurality of base stations capable of communicating with a plurality of mobile stations, an interworking function unit capable of transferring data between said wireless network and an Internet protocol (IP) data network coupled to said wireless network, said interworking function unit comprising:

a protocol conversion controller capable of receiving from said wireless network a first plurality of data packets, wherein said first plurality of data packets are generated by a first one of said plurality of mobile stations and are formatted according to a first protocol associated with said wireless network, and converting said first plurality of data packets to a plurality of IP data packets formatted according to an Internet protocol associated with said IP data network; and a first security controller for preventing unprovisioned mobile stations from accessing said IP data network through said wireless network, wherein said first security controller is capable of receiving at least one of said plurality of IP data packets and replacing an original IP packet header of said at least one IP data packet with a replacement IP packet header comprising an IP address of a selected one of at least one provisioning server coupled to said IP data network and controlled by an operator of said wireless network.

2. The interworking function unit as set forth in claim 1 further comprising a second security controller capable of determining that said first mobile station is unprovisioned.

3. The interworking function unit as set forth in claim 2 wherein said second security controller is disposed in said protocol conversion controller.

4. The interworking function unit as set forth in claim 2 wherein said second security controller is disposed in said first security controller.

5. The interworking function unit as set forth in claim 2 wherein said second security controller determines that said first mobile station is unprovisioned according to one of:

1) a value of a provisioned bit associated with at least one of said first plurality of data packets; and 2) a value of an IP address assigned to said first mobile station.

6. The interworking function unit as set forth in claim 1 wherein said first security controller selects said at least one provisioning server by selecting said IP address in said replacement IP packet header according to a load spreading algorithm.

7. The interworking function unit as set forth in claim 6 further comprising a memory associated with said first security controller capable of storing load statistics associated with said at least one provisioning server.

8. The interworking function unit as set forth in claim 7 wherein said first security controller selects a least busy one of said at least one provisioning server according to said load statistics.

9. A wireless network comprising:

a plurality of base stations capable of communicating with a plurality of mobile stations; and an interworking function unit capable of transferring data between said wireless network and an Internet protocol (IP) data network coupled to said wireless network, said interworking function unit comprising:

a protocol conversion controller capable of receiving from said wireless network a first plurality of data packets, wherein said first plurality of data packets are generated by a first one of said plurality of mobile stations and are formatted according to a first protocol associated with said wireless network, and converting said first plurality of data packets to a plurality of IP data packets formatted according to an Internet protocol associated with said IP data network; and a first security controller for preventing unprovisioned mobile stations from accessing said IP data network through said wireless network, wherein said first security controller is capable of receiving at least one of said plurality of IP data packets and replacing an original IP packet header of said at least one IP data packet with a replacement IP packet header comprising an IP address of a selected one of at least one provisioning server coupled to said IP data network and controlled by an operator of said wireless network.

10. The wireless network as set forth in claim 9 further comprising a second security controller capable of determining that said first mobile station is unprovisioned.

11. The wireless network as set forth in claim 10 wherein said second security controller is disposed in said protocol conversion controller.

12. The wireless network as set forth in claim 10 wherein said second security controller is disposed in said first security controller.

13. The wireless network as set forth in claim 10 wherein said second security controller determines that said first mobile station is unprovisioned according to one of:

1) a value of a provisioned bit associated with at least one of said first plurality of data packets; and 2) a value of an IP address assigned to said first mobile station.

14. The wireless network as set forth in claim 9 wherein said first security controller selects said at least one provisioning server by selecting said IP address in said replacement IP packet header according to a load spreading algorithm.

15. The wireless network as set forth in claim 14 further comprising a memory associated with said first security controller capable of storing load statistics associated with said at least one provisioning server.

16. The wireless network as set forth in claim 15 wherein said first security controller selects a least busy one of said at least one provisioning server according to said load statistics.

17. For use in an interworking function unit associated with a wireless network, the wireless network comprising a plurality of base stations capable of communicating with a plurality of mobile stations, a method of preventing unprovisioned mobile stations from accessing an Internet protocol (IP) data network coupled to the wireless network, the method comprising the steps of:

receiving from the wireless network a first plurality of data packets, wherein the first plurality of data packets are generated by a first one of the plurality of mobile stations and are formatted according to a first protocol associated with the wireless network;

converting the first plurality of data packets to a plurality of IP data packets formatted according to an Internet protocol associated with the IP data network; and replacing an original IP packet header of at least one IP data packet with a replacement IP packet header comprising an IP address of a selected one of at least one provisioning server coupled to the IP data network and controlled by an operator of the wireless network.

18. The method as set forth in claim 17 including the further step of selecting the at least one provisioning server by selecting the IP address in the replacement IP packet header according to a load spreading algorithm.

19. The method as set forth in claim 18 wherein the step of selecting selects a least busy one of the at least one provisioning server.

20. The method as set forth in claim 17 including the further step of determining whether the first mobile station is provisioned.

* * * * *